United States Patent [19]

Han

[11] Patent Number: 4,489,600
[45] Date of Patent: Dec. 25, 1984

[54] WATER METER WITH AN ANTI-REVERSE-ROTATION DEVICE

[75] Inventor: Eui M. Han, Seoul, Rep. of Korea

[73] Assignee: Shinhan Kongki Co., Ltd., Incheon, Rep. of Korea

[21] Appl. No.: 471,851

[22] Filed: Mar. 3, 1983

[30] Foreign Application Priority Data

Sep. 3, 1982 [KR] Rep. of Korea ............ 1982-6976[U]

[51] Int. Cl.³ ........................ G01F 1/075; G01F 15/06
[52] U.S. Cl. .................................. 73/275; 73/861.79; 235/94 R
[58] Field of Search ............... 73/275, 861.79, 861.87, 73/861.88, 861.94; 235/94 R

[56] References Cited

U.S. PATENT DOCUMENTS

| | | | |
|---|---|---|---|
| 387,828 | 8/1888 | Thomson | 73/275 X |
| 932,502 | 8/1909 | Sitts | 73/275 X |
| 3,295,370 | 1/1967 | Marx | 73/861.94 |

FOREIGN PATENT DOCUMENTS

| | | | |
|---|---|---|---|
| 239407 | 1/1946 | Switzerland | 73/861.79 |
| 535762 | 4/1941 | United Kingdom | 73/275 |

Primary Examiner—Charles A. Ruehl
Attorney, Agent, or Firm—Birch, Stewart, Kolasch & Birch

[57] ABSTRACT

An improved magnetic rotor type water meter having an anti-reverse-rotation device for preventing the reverse rotation of the pointer driving gear of the water meter, although the rotor or impeller of the water meter is rotated in the reverse direction by a counterflow from the outlet or by any type of fluid pressures applied to the outlet.

4 Claims, 6 Drawing Figures

FIG. 1
PRIOR ART
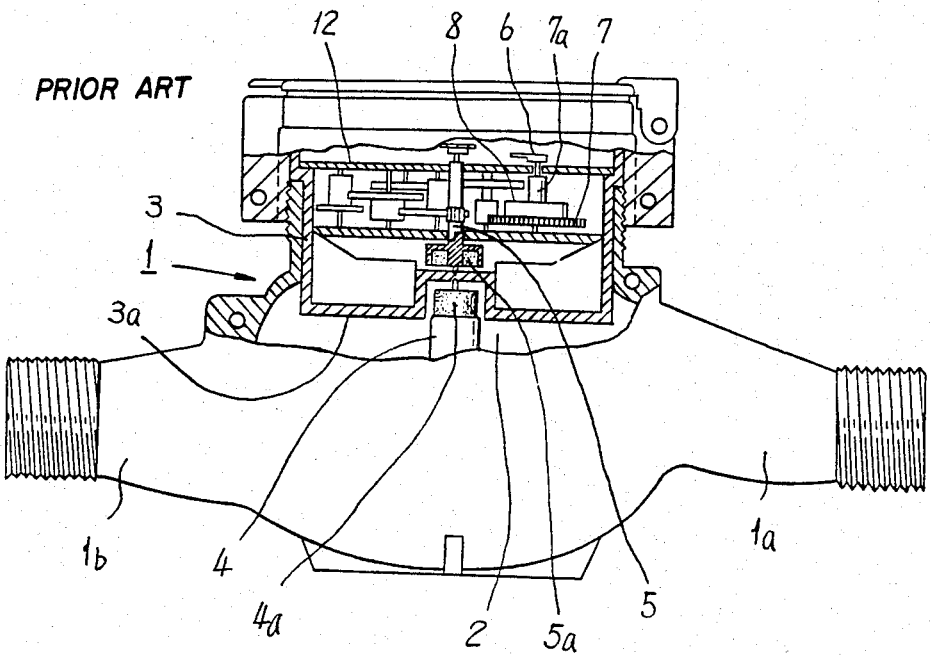
PRIOR ART FIG. 2
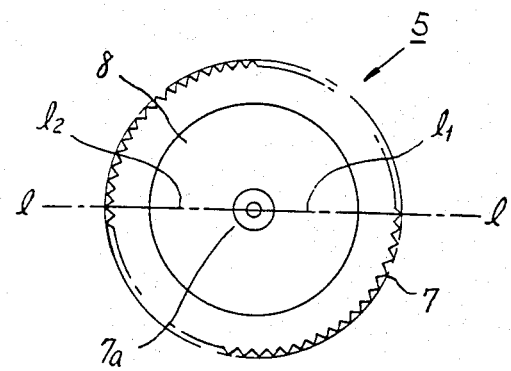
FIG. 4
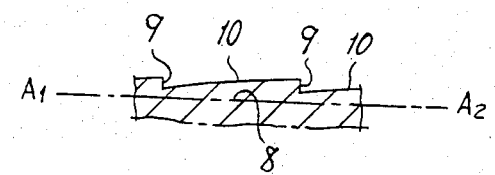
FIG. 3
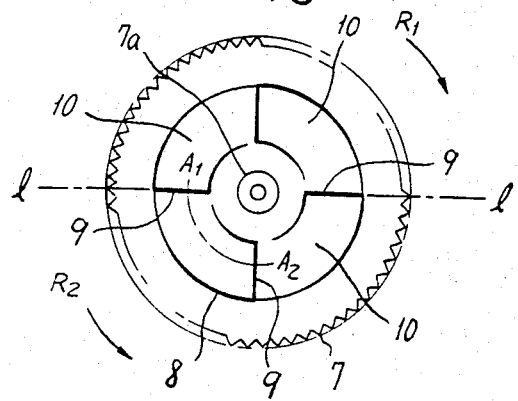
FIG. 5
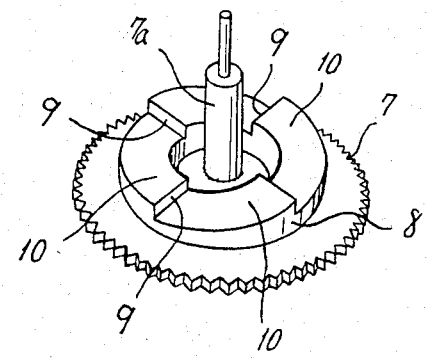

WATER METER WITH AN ANTI-REVERSE-ROTATION DEVICE

This invention relates to an improved magnet rotor type water meter having an anti-reverse-rotation device for preventing the reverse rotation of the pointer driving gear of said water meter although the rotor or impeller of the water meter is rotated in the reverse direction by a counterflow from the outlet or by any type of fluid pressures applied to said outlet.

The prior magnet rotor type water meters have the disadvantages that the pointer driving gear can be rotated in the reverse direction when the rotor or impeller is reversed by a counterflow due to the interruption of water supply or by a fluid or air pressure artificially applied to the outlet, that is, from the opposite direction and consequently, the normally integrated counts become reduced again.

Therefore, these prior water meters can not perfectly fulfill their functions because said rotors may be easily rotated in the reverse direction to reduce the normal counts already integrated.

The conventional water meters with the magnet-type rotors are usually of solid and simple construction and greatly lighten the users' burden thanks to their low production costs and accordingly they are particularly suitable for the practical use. However in the hilly sections and in the newly developed areas of a city, the water supplies are often interrupted due to the expansion works of the water supply systems. Accordingly, the public waterworks offices are apt to decline the adoption of such prior magnet rotory type meters for fear that the already integrated counts will be reduced by the counterflow of water or by any type of fuid pressures artificially applied during the interruption of water supply.

In order to solve the problems mentioned above, I have proposed in my prior Korean utility model application No. 82-1814 an improved water meter provided with an anti-reverse-rotation device for presenting the reverse rotation of the vane wheel, wherein the back stops are formed on the vane wheel and the stop pins are slidably mounted within the stop pin cylinders integrally formed on the underside of the bearing plate, whereby the stop pins and backstops are designed to be operated under water.

Since the anti-reverse-rotation device is designed to be mounted directly onto the vane wheel which is rotated by the water flow from the inlet, the amount of starting water will be increased, though very small, to some degree.

Therefore, said anti-reverse-rotation device should be manufactured in such manner that the increase of starting water can be minimized as far as possible. Furthermore, a plurality of fine grooves should be provided longitudinally on the inside wall of the pin cylinder so that the fine materials within water can be discharged through said grooves without furring the inside wall of the pin cylinders. Consequently, said device will have a complicated construction and require the precision manufacture of the metal mould.

The object of the present invention is to provide an improved magnet rotor type water meter with an anti-reverse-rotation device which eliminates said complicated problems of the prior art mentioned above. In the preferred embodiment of the present invention, back stops are formed on the upper side of the pointer driving gear of the instrument gear assembly housed in the instrument casing located above the rotor chamber and stop-pin cylinders are formed integrally on the underside of the upper plate, i.e. the scale plate, in the vicinity of the upper gear shaft of said pointer driving gear.

The preferred embodiment in accordance with the present invention will now be more particularly described with reference to the accompanying drawings wherein:

FIG. 1 is a partially broken-open sectional view of the prior magnet rotor type water meter.

FIG. 2 is a plan view of the pointer driving gear of FIG. 1.

FIG. 3 is a plan view of the pointer driving gear for preventing the reverse rotation thereof in accordance with the present invention.

FIG. 4 is a sectional view taken on the line $A_1$–$A_2$ of FIG. 3.

FIG. 5 is a perspective view of the pointer driving gear of FIG. 3.

Figure 6:
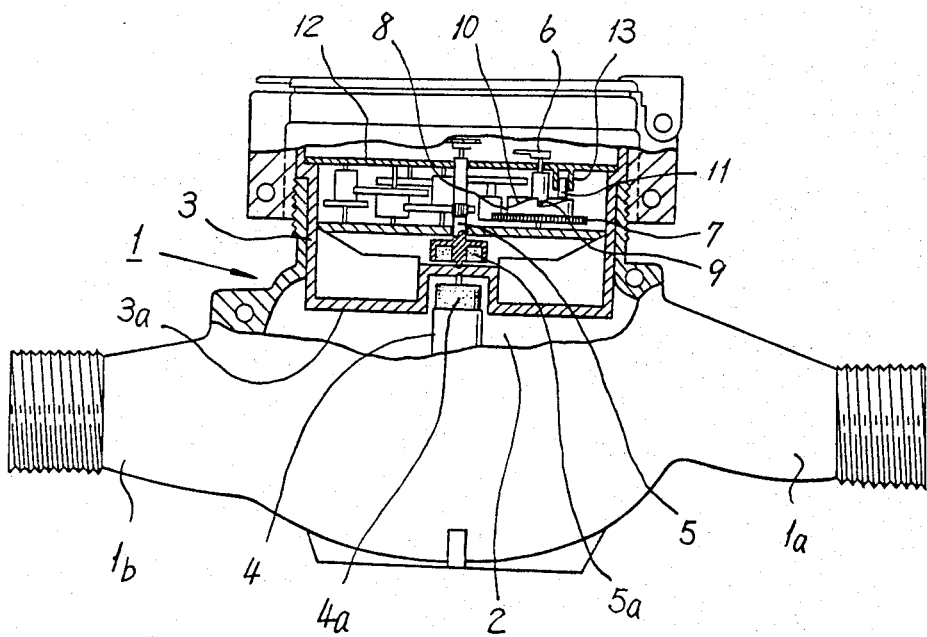
FIG. 6 is a partially broken-open sectional view illustrating the anti-reverse-rotation device in accordance with the present invention.

Referring to FIG. 1, the prior magnet rotor type water meter comprises a meter body 1, a rotor chamber 2 formed under said meter body 1, an inlet 1a and an outlet 1b formed integrally on both sides of said rotor chamber 2, a rotor housed in said chamber 2 (not shown), a hermetically enclosed inner casing 3 and a set of the instrument gear assembly housed in said inner casing 3 located above said chamber 2, wherein said inlet 1a and outlet 1b are communicated through said rotor chamber 2 and said rotor has a ferrite magnet 4a securely inlaid onto the upper end of the rotor shaft 4.

As can be clearly perceived from the above explanation, said rotor may be rotated not only by the normal water flow from said inlet 1a but also by a counterflow (water or compressed air) from said outlet 1b because said prior magnet rotor type water meter has the inlet 1a and outlet 1b each provided on both sides of the rotor chamber 2.

Accordingly, in said prior magnet-rotor type water meters, the amount of water inflowing from the inlet 1a can be normally integrated, but if a counterflow is applied to said outlet 1b during the interruption of the water supply, the rotor will be rotated in the reverse direction and thus the normally integrated counts of the water amount will be reduced.

In the operation of said prior magnet rotor type water meter, as said rotor shaft 4 is rotated, said ferrite magnet 4a cooperates magnetically with the ferrite magnet 5a securely inlaid onto the lower end of the central main shaft 5 of said instrument gear assembly housed in said hermetically enclosed inner casing 3 whereby said central main shaft 5 drives said instrument gear assembly, thereby driving said pointer driving gear 7 with the gear shaft 7a and thus rotating the instrument pointer 6 mounted on the upper end of said gear shaft 7a.

In view of the instrument mechanism for integrating the water amount, the present invention has the same construction as said prior magnet rotor type water meter, except that in the present invention said anti-reverse-rotation device for preventing the reverse rotation of said pointer driving gear 7 is provided directly on said pointer driving gear 7 as shown in FIG. 3.

As illustrated in FIGS. 2 to 5, one or more stepped back stops 9 are formed along the line $l_1$ and $l_2$ on the upper side of said pointer driving gear 7 wherein said stepped back stops 9 are gradually sloped down toward the normal rotational direction $R_1$ of said gear 7 to form inclined planes 10.

FIG. 4 illustrates a cross-sectional view of said inclined planes 10 and said stepped back stops 9 taken along the line A—A of FIG. 3 and consequently, said pointer driving gear 7 of the present invention will be shaped as shown in FIG. 5.

In the operation of said pointer driving gear 7 of the present invention, if said pointer driving gear 7 is caused to rotate in the reverse direction $R_2$, said stepped back stops 9 will be caught by the respective stop pins 11 as will be explained hereinafter.

In the preferred embodiment of the present invention, one or more stop-pin cylinders 13 are provided onto the underside of the scale plate 12 located above said inner casing 3 in the vicinity of the upper shaft of said pointer driving gear 7 as shown in FIG. 6 whereby said stop-pins 11 will be slidably received within said stop-pin cylinders 13.

In the above embodiment, it will be required that said stepped back stops 9 are high enough to be caught by said stop pins 11 when said pointer driving gear 7 is caused to rotate in the reverse direction $R_2$ and said inclined planes 10 are constructed in such fashion that the lower ends of said stop pins 11 slide smoothly on said inclined planes 10 while said stop pins 11 are moved up- and downwards within said stop pin cylinders 13 due to the cam action of said inclined planes 10 when said pointer driving gear 7 is rotated in the normal rotational direction $R_1$.

As can be well understood in the above description, the numbers of said stepped back stops 9 and stop pin cylinders 13 are not limited and the vertical walls of said cylinders 13 should be of solid construction.

It will be well perceived that the present invention presents many advantages from the standpoint of efficiency, simple construction with low production cost and reliability, as compared with the prior water meters.

I claim:

1. A magnet-rotor type water meter with an anti-reverse-rotation device comprising:
    a rotor chamber accommodating a rotor with rotor shaft wherein said rotor shaft is provided with a ferrite magnet securely inlaid onto the upper end thereof,
    a hermetically enclosed inner casing located above said rotor chamber,
    a scale plate mounted on the upper end of said inner casing,
    an instrument gear assembly housed in said inner casing wherein said instrument gear assembly includes a central main shaft and a pointer driving gear, said central main shaft being provided with a ferrite magnet securely inlaid onto the lower end thereof and said pointer driving gear being provided with an instrument pointer securely mounted on the upper end of the gear shaft of said pointer driving gear,
    whereby said ferrite magnet magnetically cooperates with said ferrite magnet as said rotor shaft is rotated and thereby said central main shaft is rotated to drive said instrument gear assembly and thus to rotate said instrument pointer, and
    characterized in that one or more stepped back stops are formed on the annular upper side of said pointer driving gear, and each of said stepped back stops is gradually sloped down in the normal rotational direction $R_1$ to form an inclined plane, and one or more stop pin cylinders are provided on the underside of said scale plate in the vicinity of the upper gear shaft, and one or more stop pins are slidably inserted each into said stop pin cylinders, whereby the lower ends of said stop pins smoothly slide on said inclined planes while moving up- and downward within said stop-pin cylinders due to the cam action of said inclined planes without preventing the rotation of said pointer driving gear in the normal direction $R_1$, whereas said stepped back stops are caught by said stop pins, thereby preventing the reverse rotation of said pointer driving gear when rotating in the reverse direction $R_2$.

2. A magnet rotor type water meter with an anti-reverse-rotation device according to claim 1 characterized in that said device comprises more than two stepped back stops, stop pins and stop pin cylinders respectively.

3. A magnet rotor type water meter with an anti-reverse-rotation device according to claim 2 characterized in that said stop pin cylinders are formed on the underside of said scale plate.

4. A magnet rotor type water meter with an anti-reverse-rotation device according to claim 2 characterized in that said stepped back stops are formed along the radius line drawn through the center of said pointer driving gear on the upper side thereof, and said back stops are gradually sloped down in the normal rotational direction $R_1$ to form said inclined planes.

* * * * *